April 4, 1967 M. DAVIS 3,312,106
FLOW METER
Filed Dec. 7, 1964 2 Sheets-Sheet 1
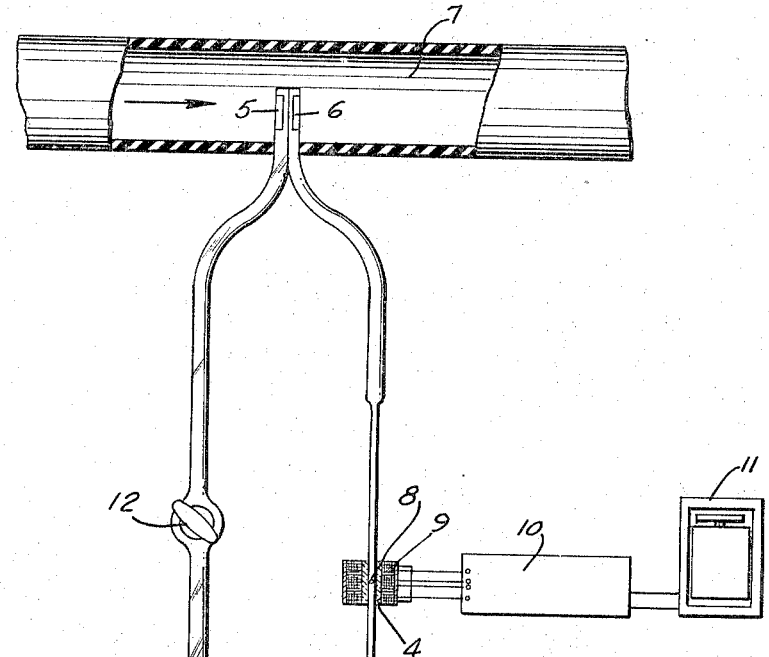
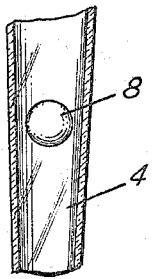
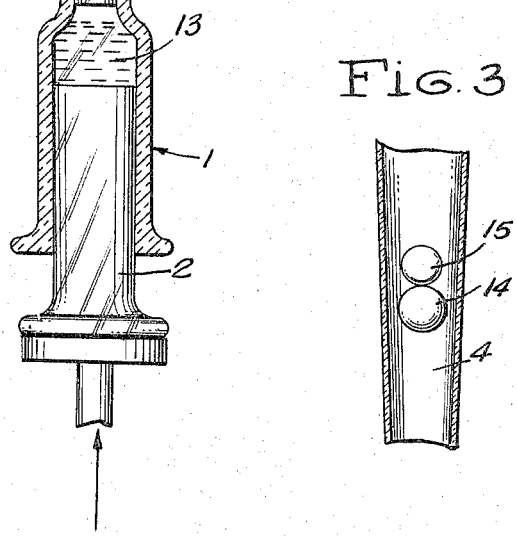
INVENTOR.
MERLIN DAVIS
BY Joseph A. Hice
ATTORNEY

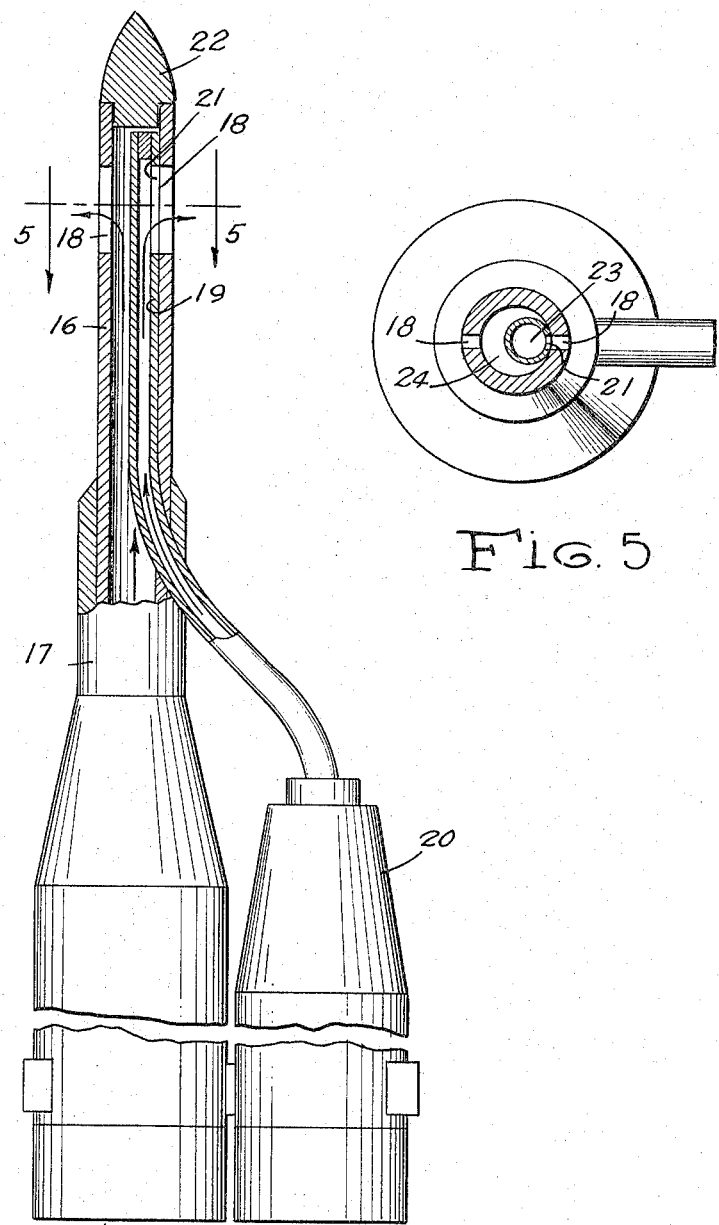

United States Patent Office

3,312,106
Patented Apr. 4, 1967

---

3,312,106
FLOW METER
Merlin Davis, Washington, D.C., assignor to the United States of America as represented by the Secretary of the Army
Filed Dec. 7, 1964, Ser. No. 416,658
9 Claims. (Cl. 73—194)

The invention described herein may be manufactured and used by or for the Government for governmental purposes without the payment to me of any royalty thereon.

The invention described herein relates generally to a novel means for measuring the rate of flow of a fluid.

More specifically this invention relates to a novel means of measuring the rate of flow of a fluid in conduits that are inaccessible to other known means for measuring the rate of fluid flow.

Often it is desirable to be able to measure the rate of flow of a fluid within a pipe, tube, conduit, or like vessel which, because of the size or location of the vessel carrying the said fluid, it is impractical to measure by conventional means. It is one of the objects of this invention therefore to provide for such measurements.

Furthermore, it has been found that in the measurement of the rate of flow of certain fluids that errors are caused by the insertion of measuring devices into the fluid. For instance, in the measurement of the rate of flow of blood within blood vessels it has been found that the insertion of measuring devices into the blood causes the introduction of errors due to the clotting of the blood around the measuring devices. Therefore, it is a further object of this invention to allow for the measurement of the rate of flow of fluids without the causing of such clotting or crystalization of the measured fluid and the concomitant errors in measurement which are introduced.

In order to achieve these objects, I rely upon a novel means of measurement of fluid flow which employs the pumping of a fluid into the flow stream through two orifices such that the fluid injected into the flow stream is controlled to maintain the proportioning as the flow rate of the flow stream varies. One of the orifices faces upstream and the other faces downstream. The differential flow of the fluid from these two orifices is a measure of the rate of flow of the fluid in the vessel to be measured if the solution is provided to the two orifices at a common and substantially constant pressure. The measurement of the differential flow is achieved by employing a miniaturized rotameter within the tube leading to one of the above-mentioned orifices. The float of this rotameter is made of magnetic material and forms the core of a differential transformer The displacement of the float of the rotameter, which is recorded electronically, provides a measure of the rate of flow of the fluid within the vessel.

For a fuller understanding of the nature and objects of the invention as well as for a specific embodiment thereof, reference should be had to the following detailed description and the accompanying drawings in which:

FIG. 1 represents the embodiment of the invention as a device for measuring the rate of flow of blood within a blood vessel;

FIG. 2 represents an enlargement of the rotameter;

FIG. 3 is an enlarged view of another modification of a rotameter;

FIG. 4 is an elevational view, partly in section, of an injection probe including oppositely directed orifices; and FIG. 5 is a view taken on the line 5—5 of FIG. 4.

Referring now to FIG. 1, the specific embodiment of the invention employs a constant displacement pump 1 which provides a substantially constant flow of a saline solution 13 through two tubes 3 and 4 to two orifices 5 and 6 placed within a tube 7 the flow of fluid within which is desired to be determined. A valve 12 controls the flow of fluid in tube 3. The plunger 2 of the pump 1 is actuated by a screw which in turn is operated by a worm-gear reduction motor, not shown. Alignment is aided by the use of a large ball between the end of the screw and the plunger 2. Tube 7 represents a blood vessel and the fluid flow to be measured in the embodiment is the rate of flow of the blood in the vessel. One of the tubes 4 leading from the constant displacement pump 1 is tapered to contain a spherical float 8, made of a magnetic material, which acts as a rotameter The rotameter float 8 forms the core of a differential transformer 9 which is electronically connected to an oscillator and bucking amplifier 10 and a recorder 11 A float-core structure which provided an adequate linear range of operation consisted of a 0.7 mm. steel ball 14 cemented or held by magnetic attraction to a 0.6 mm. ferrite-Q ball 15 as shown in FIG. 3.

The operation of the device embodying the invention is as follows. The essentially constant displacement plunger pump 1 injects a solution through two tubes 3 and 4 which are provided with longitudinally slotted orifices 5 and 6 positioned near their respective tips. The slot 5 on tube 3 is directed upstream against the flow of blood in the blood vessel 7. The slots 6 on tube 4 is directed downstream with the flow of fluid in the vessel 7. The combined saline discharge passing through both slots 5 and 6 will remain substantially constant provided the pump 1 provides a relatively constant flow of saline to the two tubes 3 and 4 at a relatively high pressure compared with the forces developed by the blood pressure within the blood vessel 7. The relative discharge through the slots 5 and 6 should remain constant in spite of pressure variations in the vessel, resulting from static head fluctuations, since these pressures are identical against both openings and therefore cancel out hydraulically.

Pressure variations due to changes in velocity head, on the other hand, are positive on one side and negative on the other, so that, although the combined volume of saline pumped into the vessel from both tubes 3 and 4 remains fixed, there will be a decrease of saline flow in one of the tubes and a compensating increase in the other tube.

To measure this differential flow rate a transducer is employed in the form of a rotameter which has been miniaturized for low flow rates. The float 8 is made of a magnetic material and forms the core of a differential transformer 9. Operation of the differential transformer 9 is based on the essentially linear change of flux-linkage between a primary coil and secondary coils, which are connected in series opposition, resulting from a vertical displacement of the core; in this case, the float 8. The float 8 is protected from straying by means of a permanent magnet (not shown). The induced signals are fed to an amplifier 10, with provisions for bucking out the input no-flow signal, and subsequently passed on to a recorder 11.

Other constructions than that shown at 3 and 4 in FIG. 1 with slots 5 and 6 may be used. In some controlled experimental research, where precise volume flow-rate measurements are required, a dual injection needle which is permanently mounted within a tube or cannula is satisfactory. In other work of a clinical nature, a probe may be required in the form of a needle which can be used to puncture the vessel 7 for the purpose of recording average relative velocities. A particular design for this purpose is shown in FIGS. 4 and 5. A tube 16 terminating in a point 22 to puncture vessel 7 and having an outside diameter equal to that of a number 17 hypodermic needle and supported in an appropriate holder 17 is slotted as at 18; the slots being 0.006 to 0.125 inch. An eccentrically placed inner tube 19 is brazed to the outer tube 16, passes through holder 17 and is supported in a number 21 hypodermic head 20. Tube 19 is also slotted as at 21 to the same dimensions as tube 16 and the slot 21 is in register with one of the slots 18 thus providing separate oppositely disposed openings. Area 23 must be approximately equal to area 24.

I claim:

1. A device to measure the rate of flow of fluids comprising:
   (a) fluid supply means for supplying fluid at a substantially constant rate of flow;
   (b) bifurcated conduit means terminating in juxtaposed oppositely directed outlets adapted to be injected into a fluid stream, the axis of each of said outlets being in a direction substantially parallel to the flow of the fluid stream, said fluid supply means connected to the inlet of said bifurcated conduit means to supply fluid to the fluid stream through said conduit means;
   (c) a rotameter for measuring the rate of flow of the fluid stream, disposed in one branch of said bifurcated conduit means and including magnetic float means;
   (d) differential transformer means disposed about one branch of said bifurcated conduit means and positioned to include within the core thereof said magnetic float means; and
   (e) amplifying and recording means connected to said differential transformer means for measuring the rate of flow of a fluid stream as determined by the displacement of said magnetic float means, said displacement being proportional to the unbalance of the flow of the fluid supply in the bifurcated conduit means caused by the flow of the fluid stream.

2. A device as recited in claim 1 further including a valve in a branch of said bifurcated conduit means other than the branch including said rotameter.

3. A device to measure the rate of flow of a fluid stream in a conduit comprising:
   (a) fluid supply means for supplying fluid at a substantially constant rate of flow;
   (b) a bifurcated tubular member terminating in juxtaposed oppositely directed outlets adapted to project into the fluid stream in the conduit the axis of each of said outlets being in a direction substantially parallel to the flow of the fluid stream, said fluid supply means connected to the inlet of said bifurcated tubular member, to supply fluid to the fluid stream in the conduit through said tubular member;
   (c) a first branch of said bifurcated tubular member including a valve and a second branch having a portion of restricted diameter;
   (d) a rotameter for measuring the rate of flow of the fluid stream in the conduit, disposed in said portion of restricted diameter in said second branch of said bifurcated tubular member and including magnetic float means;
   (e) diffeerntial transformer means surrounding said restricted portion of said second branch of said bifurcated tubular member and positioned to include within the core thereof said magnetic float means; and
   (f) recording and amplifying means connected to said differential transformer means for measuring the rate of flow of the fluid stream in the conduit as determined by the displacement of said magnetic float means, said displacement being proportional to the unbalance of the flow of the fluid supply in the branches of the bifurcated tubular member caused by the flow of the fluid stream in the conduit.

4. A device as recited in claim 3 wherein said fluid supply means comprises a hypodermic syringe having a unidirectionally operated plunger.

5. A device as recited in claim 3 wherein said magnetic float means comprises a steel ball.

6. A device as recited in claim 3 wherein said magnetic float means comprises a pair of connected balls of magnetic material and relatively different diameters.

7. A device as recited in claim 3 wherein said bifurcated tube comprises a pair of conduits joined at one end to a common inlet and extending independently from said common inlet in spaced relation and terminating in juxtaposed position with the outlet of each conduit relatively diametrically opposed.

8. A device to measure rate of flow of fluids comprising:
   (a) fluid supply means for supplying fluid at a substantially constant rate of flow;
   (b) bifurcated conduit means terminating in a probe adapted to be injected into a fluid stream and having oppositely directed outlets adjacent the end thereof, so that when said end is injected into the fluid stream the axis of each of said outlets being in a direction substantially parallel to the flow of the stream, said fluid supply means connected to the inlet of said bifurcated conduit means to supply fluid to the fluid stream through said conduit means;
   (c) a rotameter for measuring the rate of flow of the fluid stream, disposed in one branch of said bifurcated conduit means and including magnetic float means;
   (d) differential transformer means surrounding one branch of said bifurcated conduit means and positioned to include within the core thereof said magnetic float means; and
   (e) amplifying and recording means connected to said differential transformer means for measuring the rate of flow of a fluid as determined by the displacement of said magnetic float means, the displacement being proportional to the unbalance of the flow of the fluid supply in said bifurcated conduit means caused by the flow of the fluid stream.

9. A device as recited in claim 8 wherein said probe comprises:
   (a) a first tubular member supported in a first holder and terminating in a tip adapted to be injected into a fluid stream and diametrically opposed outlets adjacent said tip;
   (b) said holder having a bore communicating and aligned with the bore in said tubular member;
   (c) a second tubular member of lesser diameter than said first tubular member and eccentrically secured internally of said first tubular member, said second tubular member passing through an opening in said first holder and supported in a second holder in juxtaposition to said first holder; and
   (d) said second tubular member having an outlet adjacent the free end thereof and in registry with an outlet of said first tubular member.

References Cited by the Examiner

UNITED STATES PATENTS 2,009,427  7/1935  Bentzel _____ 73—202

FOREIGN PATENTS 545,848  7/1956  Italy.

RICHARD C. QUEISSER, *Primary Examiner.*

JAMES J. GILL, *Examiner.*

E. D. GILHOOLY, *Assistant Examiner.*